United States Patent [19]

Wilkins

[11] 4,416,650
[45] Nov. 22, 1983

[54] DRIVE WHEEL AND SPROCKET ASSEMBLY

[75] Inventor: John J. Wilkins, Cincinnati, Ohio

[73] Assignee: The E.W. Buschman Company, Cincinnati, Ohio

[21] Appl. No.: 277,768

[22] Filed: Jun. 26, 1981

[51] Int. Cl.³ .................... F16H 55/30; F16H 55/12
[52] U.S. Cl. ............................... 474/161; 474/903; 474/902; 474/159; 74/447; 74/439; 198/789
[58] Field of Search ............ 474/161, 902, 903, 158, 474/159, 160, 171; 74/DIG. 10, 439, 445, 446, 447; 403/375, 345; 29/453, 451

[56] References Cited

U.S. PATENT DOCUMENTS

| 2,591,161 | 4/1952 | Kilian | 29/453 |
|---|---|---|---|
| 2,625,415 | 1/1953 | Smith | 29/453 |
| 3,023,925 | 3/1962 | Sher | 29/453 |
| 3,024,052 | 3/1962 | Oliveau | 403/375 |
| 3,256,031 | 6/1966 | Fillweber | 403/375 |
| 3,304,796 | 2/1967 | Leege | 474/161 |
| 3,651,704 | 3/1972 | Chapman | 74/439 |

FOREIGN PATENT DOCUMENTS

| 383362 | of 1932 | United Kingdom | 74/439 |
|---|---|---|---|
| 2039662A | 8/1980 | United Kingdom | 474/902 |

Primary Examiner—Lawrence J. Staab
Assistant Examiner—Michael D. Bendnarek
Attorney, Agent, or Firm—Biebel, French & Nauman

[57] ABSTRACT

A drive wheel and sprocket assembly for use in the power transmission of a conveyor device such as a roller conveyor comprises a drive wheel which is mounted on the hub of a sprocket assembly. The drive wheel mounts the hub with a modified spline connection in which a plurality of radially overhanging teeth on the drive wheel are resiliently interlocked with shoulders formed in the assembly hub. In a preferred embodiment, the drive wheel is molded of polyurethane.

9 Claims, 4 Drawing Figures

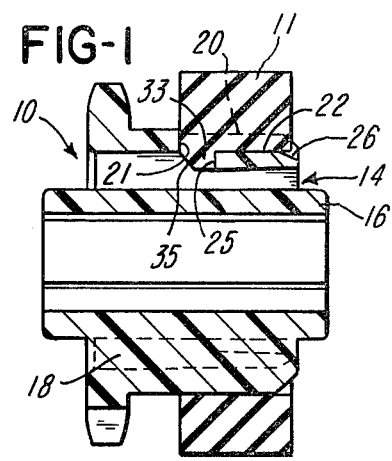
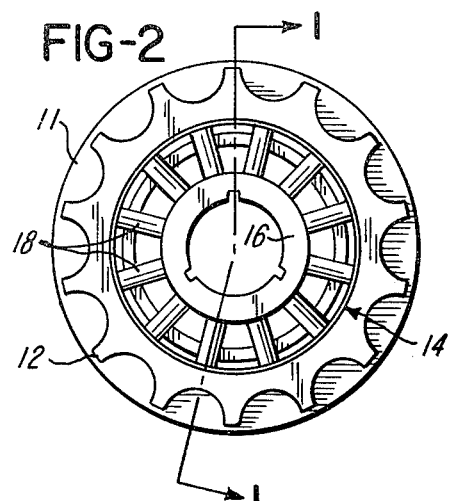
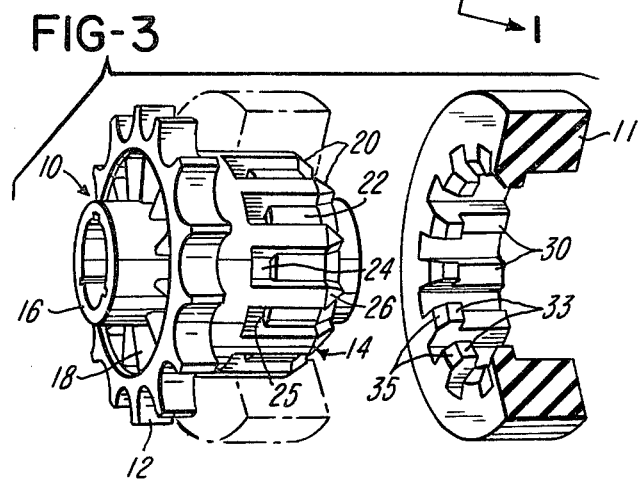
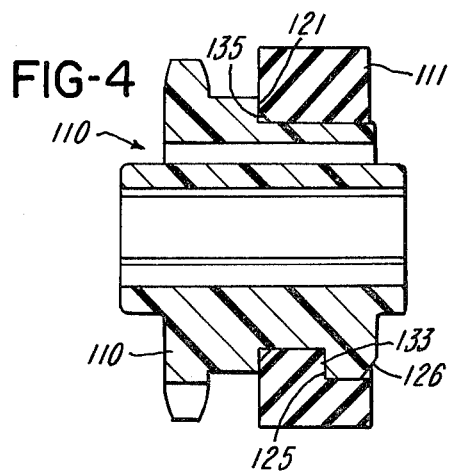

DRIVE WHEEL AND SPROCKET ASSEMBLY

BACKGROUND OF THE INVENTION

The present invention relates to a drive wheel and sprocket assembly for use in the power transmission of a conveyor. More particularly, it relates to an assembly for uses such as in the power transfer device disclosed in U.S. Pat. No. 4,108,303.

U.S. Pat. No. 4,108,303 is directed to a power transmission assembly for an accumulator conveyor and, more specifically, to a transmission assembly which is responsive to fluid signals from a fluid circuit which controls the flow of articles along the conveyor. The power transmission assembly includes a power transfer device in which a drive wheel moves between a driving position in which it frictionally engages and drives the conveyor rollers and a non-driving position in which it is out of contact with the conveyor rollers. The drive wheel is carried on a hub on which a drive sprocket is mounted at an axially spaced location.

A series of such power transmission assemblies are positioned in zones spaced along the conveyor line and linked by a drive member such as a drive chain which interconnects the drive sprockets in each zone. A fluid circuit which communicates with a deformable diaphragm positioned under each power transmission device moves the drive wheel between driving and non-driving positions. According to the patent, the drive wheel is press-fitted on the sprocket assembly hub and may be fabricated of polyurethane. It has been found that when the drive wheel is only press-fitted on the sprocket assembly hub, a certain degree of axial slippage or displacement is observed.

SUMMARY OF THE INVENTION

The present invention provides an improved means of connecting a drive wheel to a sprocket assembly hub and of assembling them. In accordance with the invention, the drive wheel is connected to the sprocket assembly hub using a spline connection modified to lock axially the drive wheel on the hub at a fixed location relative to the drive sprocket.

As in a conventional spline connection, the drive wheel has on its inside surface a plurality of circumferentially spaced ribs which extend radially inward from the inside surface of the drive wheel, and the assembly hub is provided on its outside surface with a corresponding compatible set of grooves which intermesh with the ribs on the drive wheel. The connection is modified in the invention by providing a plurality of teeth on the ribs which overhang the inner diameter of the drive wheel. Typically, each rib bears one tooth, and that tooth is located at the bow or the forewardmost position on the rib with respect to its direction of axial advance along the hub for assembly. A shoulder is formed in each of the grooves on the assembly hub to interlock with the teeth on the ribs, and in one form of the invention, the shoulders are provided by a pocket in the floor of each groove.

The drive wheel is fabricated of a material which has the appropriate balance of resiliency and rigidity to be assembled with the hub and make the axially interlocking connection and at the same time provide the appropriate frictional characteristics to function advantageously as a drive wheel. A polyurethane has been found preferred for this purpose.

The drive wheel is assembled with the sprocket assembly by slidably forcing it over the end of the sprocket assembly hub. To facilitate assembly, the teeth on the drive wheel and the axial extremity of the hub are formed with parallel lead-in tapers such that the teeth resiliently pass over the end of the hub and into the pockets at the base of the grooves to lock the drive wheel against axial movement on the hub. Once assembled, the teeth on the drive wheel prevent it from being removed from the hub with prying it off with considerable force.

BRIEF DESCRIPTION OF THE DRAWING

FIG. 1 is a view in axial section on the line 1—1 of FIG. 2 of one embodiment of the drive wheel and sprocket assembly of the invention;

FIG. 2 is a view partly in elevation and partly in axial section of the sprocket component of the assembly in FIG. 1;

FIG. 3 is an isometric view illustrating the manner of assembling the drive wheel and sprocket components to form the assembly of FIG. 1, and FIG. 4 is a view similar to FIG. 1 showing another embodiment of the invention.

DETAIL DESCRIPTION OF A WORKING EMBODIMENTS

The embodiment of the present invention shown in the drawing comprises a sprocket assembly 10 and a drive wheel 11. The sprocket assembly includes a drive sprocket 12 which is fixedly mounted on or formed integrally with a hub 14, which in turn concentrically mounts on or is formed integrally with a sleeve or bushing portion 16 by which the assembly is mounted for use on a shaft or axle. In the embodiment illustrated, the drive sprocket 12, the hub 14, and the axle sleeve 16 are integrally molded of a high strength plastic, and the hub 14 is connected to the axle sleeve 16 by a plurality of co-molded spacing means or spokes 18.

It will be appreciated that the invention assembly is also useful to mount the drive wheel on a hub which does not include a drive sprocket or other wheel member. Such an embodiment may be mounted, for example, on a shaft having its drive member separately mounted thereon. Further, the drive sprocket can be replaced on the drive wheel assembly in this drawing by other rotatable power transfer means, such as by a drive pulley similarly integrally molded with the hub portion 14.

The outer surface of the sprocket assembly hub 14 presents a plurality of axially extending grooves 20 which terminate in shoulders 21, and are preferably circumferentially spaced equal distances apart for forming a spline connection between the sprocket assembly 10 and the drive wheel 11. The floor 22 of the grooves 20 extends only a portion of the total axial length of the grooves and terminates in a pocket 24 which is radially inset or undercut in the base of the groove 20 to provide a shoulder 25 at the inner end of each groove 20. Assembly hub 14 is bevelled with a radially inward taper 26 at its axial extremity.

The drive wheel 11 is formed of a resilient polymeric material which provides the frictional characteristics and resiliency required for assembly. The drive wheel 11 is formed with a plurality of ribs 30 extending axially thereof in circumferentially spaced relation around its inside circumference a distance corresponding to the separation between the grooves 20 on the hub 14. The diameters of the drive wheel and the sprocket assembly hub, the widths and depths of the ribs and grooves, and the spacing between the ribs and grooves are such that there is an interference fit between the sprocket assembly hub and the drive wheel when assembled.

Ribs 30 have formed thereon teeth 33 which are typically radially overhanging extensions of the ribs. In FIG. 1, teeth 33 are shown at the forwardmost position of the ribs 30 with respect to the direction in which the drive wheel mounts the hub for assembly, with the inner ends of the ribs abutting the shoulders 21. Those skilled in the art will appreciate that this design may be modified to locate teeth 33 at mid portions or the rearmost portions of the ribs. Teeth 33 are formed with a lead-in taper 35 for cooperation with the tapered surface 26 on the outer end of hub 14 to facilitate assembly with the sprocket assembly hub.

While the device is illustrated with one tooth on each rib, it should be evident that only as many teeth are required as necessary to lock the drive wheel on the hub. Some ribs, therefore, may be formed without any teeth. The teeth shown in the figure have a generally rectangular plan, however, other radially overhanging extensions may be designed which perform equally as well, for example, the teeth may be semispherical in which case the lead in taper is provided by the arcuate surface of the spherical portion. Preferably, the backside faces of the teeth are at right angles to the rib to provide optimum engagment between the teeth and the pockets 24.

In accordance with the invention, a modified spline connection is formed between the sprocket assembly 10 and the drive wheel 11. This connection prevents rotational movement of the drive wheel with respect to the sprocket assembly and, at the same time, locks the drive wheel on the sprocket assembly hub against axial displacement. The connection is formed by interengagement of the drive wheel ribs 30, and the sprocket assembly grooves 20, and by interengagement of teeth 33 in undercut pockets 24.

To make the connection, the drive wheel teeth 33 are slidably forced over the hub 14. As indicated, teeth 33 and hub extremity 26 present compatible lead-in tapers such that with the appropriate resiliency in the drive wheel 11, the drive wheel teeth can be forced over the hub 14 and into pockets 24 where they interlock with the shoulders 25 to secure the drive wheel in place. The extent to which the teeth overhang the inside radius of the drive wheel 11 and the outside radius of the hub 14 are gauged such that the teeth can be forced over the hub extremity but lock firmly in the pockets 24 once housed therein.

The drive wheel is formed of a resilient polymeric material. A material is selected which provides the frictional characteristics required to drive the conveyor and which has the requisite resiliency to fit over the hub and provide the interlock. These characteristics are a product of both material selection and molding conditions. It has been found that a drive wheel is preferred which is molded of the polyurethane commercially available from Upjohn Corporation as Pellethane 2102. Similarly, preferred results have been obtained with the sprocket assembly 10 molded of du Pont Delrin 500.

The embodiment of the invention shown in FIG. 4 is generally of the same construction described in connection with FIGS. 1–3, and includes a similar sprocket assembly 110 and drive wheel 111 having meshing grooves and ribs. Instead of a pocket in the floor of each grove, however, each groove is closed at its outer end to provide an axially inwardly facing shoulder 125, and the teeth 133 are of somewhat greater length than the teeth 33 so that when the drive wheel is fully assembled on the hub portion of the sprocket assembly, in seated engagement with the shoulders 121, the teeth 133 interlock with the shoulders 125 to secure the drive wheel on the hub portion of the assembly. Assembly of the parts is facilitated by a lead-in taper 135 on each rib 133 and complementary taper 126 on the outer end of the hub, and shoulders 125 limit movement of the drive wheel onto the hub.

Having described the invention in detail and by reference to specific embodiment thereof, it will be apparent that numerous variations and modifications are possible therein without departing from the scope of the following claims.

What is claimed is:

1. A drive wheel assembly comprising:
   a hub of rigid material coaxially mounted about an axle sleeve
   an annular body having an outer driving surface and an inner surface;
   the inner surface of said body having thereon a plurality of radially inwardly extending and circumferentially space ribs integrally connected with said body over the entire length thereof,
   means on said hub including an outside surface having thereon a plurality of grooves positioned to intermeash with said ribs to form a spline connection,
   means on said hub forming a shoulder intersecting with each of said grooves, and
   each of said ribs on said annular body including a tooth proportioned to hook over and interlock with said shoulder in the associated said groove in response to relative axial movement of said drive wheel and hub to the fully assembled relation thereof and thereby to secure said drive wheel axially on said hub,
   said drive wheel being formed of a sufficiently resilient material for temporary compression of said teeth during assembly of said parts prior to expansion thereof into said locking relation with said shoulders.

2. The drive assembly of claim 1 wherein said teeth and the axially outer ends of said grooves are provided with complementary tapered surfaces facilitating assembly thereof.

3. The assembly of claim 1 wherein said hub includes a shoulder forming the axially inner end of each of said grooves and adapted to abut said drive wheel to establish the fully assembled relation of said hub and drive wheel.

4. The drive assembly of claim 1 wherein the bottom of each of said grooves terminates in a pocket for receiving the associated said tooth with the axially outer wall of said pocket defining said shoulder interlocking with said tooth.

5. The assembly of claim 1 wherein said shoulder defines the axially outer end of the associated said groove.

6. The assembly of claim 1 wherein said annular body is formed of a resilient polymeric material.

7. The assembly of claim 6 wherein said resilient material is a flexible polyurethane.

8. The assembly of claim 1 wherein a rotatable power transfer means is coaxially and fixedly disposed on said hub and axially spaced from said annular body.

9. The assembly of claim 8 wherein said power transfer means comprises sprocket teeth integrally molded with said hub.

* * * * *

UNITED STATES PATENT AND TRADEMARK OFFICE
CERTIFICATE OF CORRECTION

PATENT NO. : 4,416,650

DATED : November 22, 1983

INVENTOR(S) : John J. Wilkins

It is certified that error appears in the above—identified patent and that said Letters Patent is hereby corrected as shown below:

Column 2, line 8, "Once assembled. The" should be --Once assembled, the--.

Column 4, line 17, "sleeve" should be --sleeve,--.

Column 4, line 26, "intermeash" should be --intermesh--.

Column 4, line 37, "drive wheel" should be --annular body--.

Signed and Sealed this

Seventeenth Day of July 1984

[SEAL]

Attest:

GERALD J. MOSSINGHOFF

Attesting Officer     Commissioner of Patents and Trademarks